(12) United States Patent
Asermely

(10) Patent No.: US 12,340,612 B2
(45) Date of Patent: Jun. 24, 2025

(54) DOCUMENT IDENTIFICATION AND SPLITTING IN AN ONLINE DOCUMENT SYSTEM

(71) Applicant: DocuSign, Inc., San Francisco, CA (US)

(72) Inventor: John William Asermely, Saint Charles, IL (US)

(73) Assignee: Docusign, Inc., San Francisco, CA (US)

( * ) Notice: Subject to any disclaimer, the term of this patent is extended or adjusted under 35 U.S.C. 154(b) by 783 days.

(21) Appl. No.: 17/156,148

(22) Filed: Jan. 22, 2021

(65) Prior Publication Data

US 2022/0237398 A1 Jul. 28, 2022

(51) Int. Cl.

| | |
|---|---|
| *G06K 9/00* | (2022.01) |
| *G06F 3/0483* | (2013.01) |
| *G06N 20/00* | (2019.01) |
| *G06V 30/414* | (2022.01) |
| *G06V 30/416* | (2022.01) |
| *G06V 30/418* | (2022.01) |

(52) U.S. Cl.
CPC .......... *G06V 30/416* (2022.01); *G06F 3/0483* (2013.01); *G06N 20/00* (2019.01); *G06V 30/414* (2022.01); *G06V 30/418* (2022.01)

(58) Field of Classification Search
CPC .................................................. G06V 30/416
See application file for complete search history.

(56) References Cited

U.S. PATENT DOCUMENTS

| | | | | |
|---|---|---|---|---|
| 9,489,597 | B2* | 11/2016 | Floyd | G06F 18/24 |
| 10,769,503 | B1* | 9/2020 | Buhler | G06F 16/56 |
| 11,238,313 | B2* | 2/2022 | Rezvani | G06F 18/24765 |
| 2018/0096203 | A1* | 4/2018 | King | G06F 40/109 |
| 2018/0239959 | A1* | 8/2018 | Bui | G06F 16/93 |
| 2020/0097717 | A1* | 3/2020 | Young | G06V 30/416 |
| 2022/0058496 | A1* | 2/2022 | Rusk | G06N 5/04 |

* cited by examiner

*Primary Examiner* — Molly Wilburn
*Assistant Examiner* — Aidan Keup
(74) *Attorney, Agent, or Firm* — Shumaker & Sieffert, P.A.

(57) ABSTRACT

An online document system can allow users to upload a document packages containing multiple individual document files. The online document system then automatically identifies and separates the component documents within an uploaded document package based on a package template for that type of document package. Based on the documents included in the document package, the online document system can automatically take action on the identified documents. The online document system may recognize component documents within a document package using a set of rules defining potential component documents that may appear within the received document package and one or more methods of recognizing each type of component document. In some embodiments, the online document system can improve package templates and recognition of component documents over time using feedback from the importing users through updates to the document identification rules and/or a supplementary probabilistic recognition system.

20 Claims, 9 Drawing Sheets

DOCUMENT IDENTIFICATION AND SPLITTING IN AN ONLINE DOCUMENT SYSTEM

BACKGROUND

This disclosure relates generally to electronic documents and more specifically to recognizing individual documents within a combined file containing multiple documents.

Many situations can require a user to manage a single file containing multiple individual documents (a "document package"). For example, business or financial transactions can involve document packages including large numbers of forms which need to be signed and/or otherwise reviewed. Document management systems exist which can manage documents (for example individual forms within a document package), however, documents may have to be individually imported into the document management system (or otherwise manually separated from each other) such that the document management system can individually track each document. Therefore, a user trying to use a document management system to manage a document package can face a tedious manual process of splitting the document package into its component documents before being able to access the features of the document management system.

Splitting a document, while not difficult for a human user, is not a trivial task and introduces opportunities for errors in splitting documents and can become time consuming for the user, especially as the number of pages in the document package increases. In some cases, a document package does not include explicit designations for which component document each individual page is associated with (or for what component documents exist within the document package). A user trying to split this document package can be forced to individually review each page of the document package to assign pages to appropriate component documents.

This barrier to entry can deter users from utilizing a document management system, even if the document management system would save time and effort for the user after the document package is split into its individual documents.

SUMMARY

An online document system can allow users to upload document packages, each containing multiple individual document files. The online document system then automatically identifies and separates the component documents within an uploaded document package based on a package template for that type of document package. Based on the documents included in the document package, the online document system can automatically take action on the identified documents (such as providing them to users for signature and/or sending a subset of component documents out for review or archiving). The online document system may recognize component documents within a document package using a set of rules defining potential component documents that may appear within the received document package and one or more methods of recognizing each type of component document. In some embodiments, the online document system can improve package templates and recognition of component documents over time using feedback from the importing users through updates to the document identification rules and/or the addition of a supplementary probabilistic recognition system after the initial pass based on the document identification rules.

Figure 1:
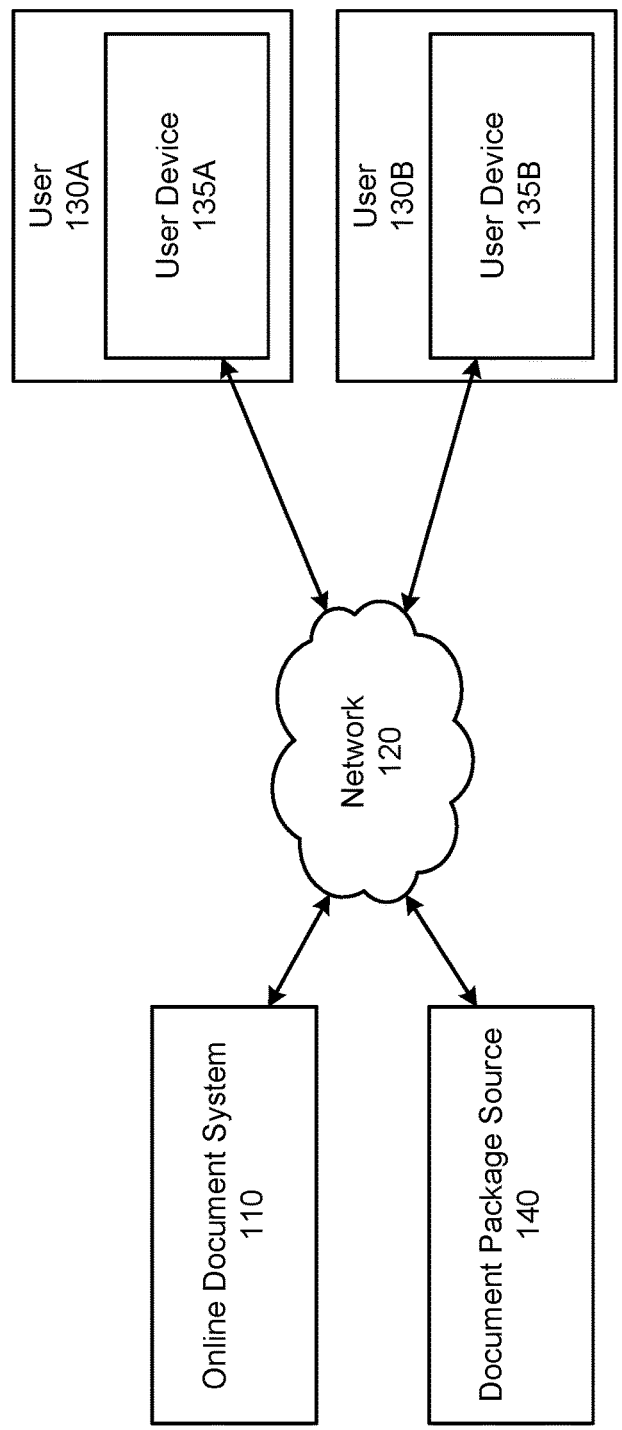
FIG. 1 is a block diagram of a system environment in which an online document system operates, according to an example embodiment.

The figures depict various embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "130A," indicates the text refers specifically to the element having that particular reference numeral. A reference numeral in the text without a following letter, such as "130," refers to any or all of the elements in the figures bearing that reference numeral (e.g., "130" in the text refers to reference numerals "130A" and "130B" in the figures).

DETAILED DESCRIPTION

Overview

An online document system can facilitate the creation, negotiation, and management of documents by one or more users of the online document system. For example, an online document system can allow users to manage, create, edit, review, negotiate and/or sign documents.

In some implementations, the online document system can provide a user interface (UI) for a user to import document packages containing multiple different individual document files. The online document system may automatically identify and separate the component documents within an uploaded document package. Based on the documents included in the document package, the online document system can then group identified component documents and/or automatically take certain actions with regard to one or more identified documents (such as providing them to users for signature, sending a subset of component documents out for review or archiving, etc.). The online document system may recognize component documents within a document package using a set of rules defining potential component documents that may appear within the received document package and one or more methods of recognizing each type of component document. In some embodiments, the online document system can improve recognition of document packages and component documents over time using feedback from the importing users. In some implementations, certain types or formats of document packages may be repetitively received by the online document system from the same source (or sources using a standardized format). For example, the online document system can receive tax return document packages containing a subset of a defined number of tax forms or mortgage closing document packets containing sets of documents that have to be reviewed and signed by various parties involved in the transaction.

As used herein, a "document package" is a single file containing multiple distinct component documents. In some implementations, the document package includes a sequence of pages, each associated with a single component document. The structure of a document package may clearly separate the pages and/or metadata associated with one or more component documents (such as in the case of a .zip file of individual document files), but in many cases a document package makes no structural distinction between the pages associated with each component document (such as in the case of a single .pdf file containing multiple consecutive documents). For these document packages, the online document system may have to individually analyze one or more pages of the document package to determine which component document the page should be associated with.

System Architecture

FIG. 1 is a block diagram of a system environment in which an online document system operates, according an example embodiment. The system environment 100 shown by FIG. 1 includes an online document system 110, a network 120, a set of users 130 (users 130A and 130B) each associated with a user device 135 (the user devices 135A and 135B, respectively), and a document package source. In alternative configurations, different and/or additional components may be included in the system environment 100.

The online document system (ODS) 110 is a computer system (or group of computer systems) for storing and managing documents for the set of users 130. Using the online document system 110, users 130 can collaborate to create, edit, review, sign and/or negotiate documents. For example, the online document system 110 may enable the collaborative creation of a contract, agreement, press release, or other type of document. Similarly, the ODS 110 may allow users 130 to manage documents received or imported from outside sources, like a user 130 or a document package source 140. As described above, the ODS 110 may receive document packages containing multiple undifferentiated documents which can be split and sorted into individual documents by the ODS 110 when the document package is added to the ODS 110 for management.

The ODS 110 may include one or more servers, server groups, server clusters, and/or other suitable computing devices or systems of devices configured to implement the functions of the ODS 110. In some implementations, the ODS 110 communicates with user devices 135 over the network 120 to receive instructions and/or documents for management by the ODS 110 and to send documents (or other information) to users 130 via the user devices 135. The ODS 110 may assign varying permissions controlling which documents a user 130 can interact with (and what actions the user 130 can take on those documents) to users 130, groups of users 130, or other entities 140. The online document system 110 will be discussed in further detail with respect to FIG. 2.

The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML). In some embodiments, all or some of the communication links of the network 120 may be encrypted using any suitable technique or techniques.

Through the network 120, the ODS 110 can communicate with user devices 135 associated with users 130. A user 130 can represent an individual, automated system, entity, or group, able to interact with documents (or other content) generated on and/or managed by the ODS 110. Each user 130 can be associated with a username, email address, user account, or other identifier that can be used by the ODS 110 identify the user 130 and to control the ability of the user 130 to view and modify documents managed by the ODS 110. In some implementations, users 130 can interact with the ODS 110 through a user account with the ODS 110 and one or more user devices 135 accessible to that user 130.

User devices 135, in some embodiments, are computing devices capable of receiving user input (from a user 130) as well as transmitting and/or receiving data to the ODS 110 via the network 120. For example, a user device 135 can be a desktop or a laptop computer, a smartphone, tablet, or another suitable device. User devices 135 may be configured to communicate with the ODS 110 via the network 120. In one embodiment, user devices 135 execute an application allowing a user 130 of the user device 135 to interact with the ODS 110. For example, a user device 135 can execute a browser or mobile application to enable interaction between the user device 135 and the ODS 110 via the network 120. A single user 130 can be associated with multiple user devices 135, in some embodiments. Similarly, one user device 135 can be shared between multiple users 130 who may, for example, log into a personal account on the user device 135 to access the online document system 110.

A document package source 140 is a computing device (such as a server or, in some cases user device 135) that submits a document package to the ODS 110 for management. In some implementations, the document package source 140 submits document packages to the ODS 110 automatically (for example, through an automated system of a company) or based on certain conditions being met. For example, a company (such as a bank or financial institution) can prepare a document package of forms for one or more users 130 to sign which is automatically forwarded to the ODS 110 (for example, based on the user 130's previous instructions to the document package source 140). In other cases, the ODS 110 may receive manually submitted document packages. For example, a user 130 can receive (or create) a document package that they wish to upload to the ODS 110 for management and manually upload the document package to the ODS 110 using an associated user device 135. Similarly, a document package source 140 can submit a specific document package to the ODS 110 at the request of a user 130. For example, a user 130 may set the ODS 110 as the location they wish the document package source 140 to send a document package associated with the user 130.

Figure 2:
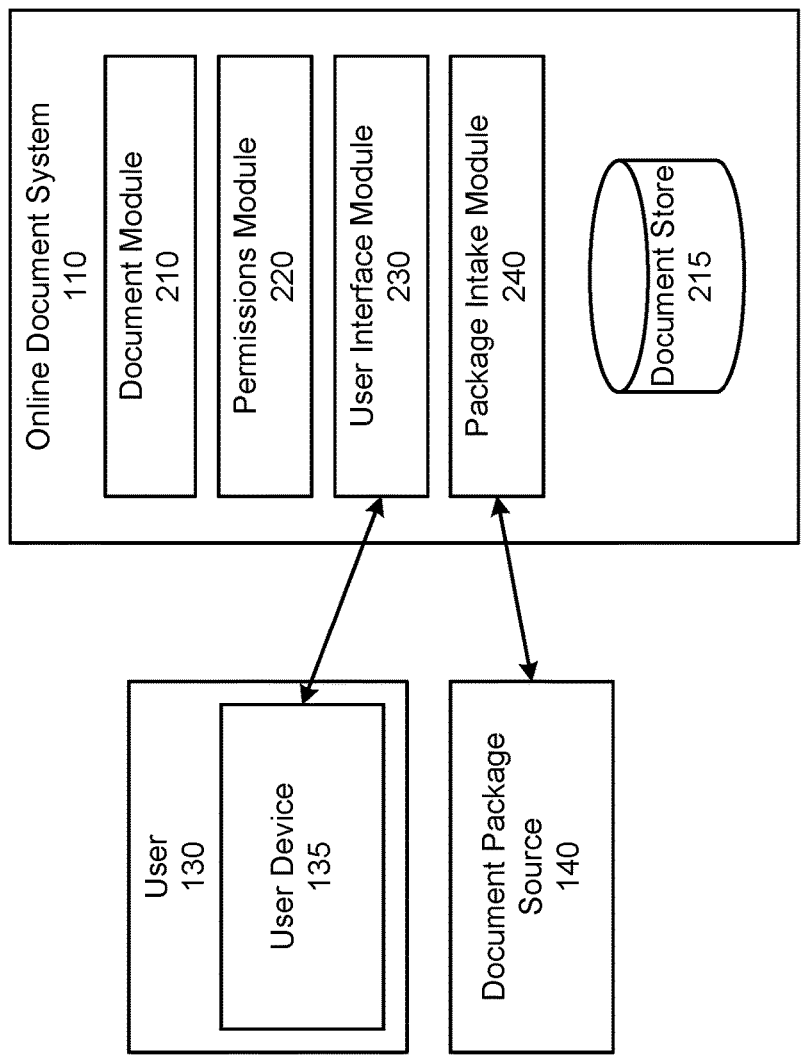
FIG. 2 is a block diagram of an online document system, according to an example embodiment.

FIG. 2 is a block diagram of an online document system, according to an example embodiment. The environment 200 of FIG. 2 shows an ODS 110 including a document module 210, a document store 215, a permissions module 220, a user interface (UI) module 230, and a package intake module 240. The environment 200 additionally shows a user 130 with a corresponding user device 135 interacting with the UI module 230 and a document package source 140 interacting with the package intake module 240. Conventional components of the online document system 110 such as network interfaces, security functions, load balancers, failover servers, management and network operations consoles, and the like are not shown so as to not obscure the details of the system architecture.

The document module 210 can generate new documents, manage and update documents stored by the ODS 110, and maintain a version history of edits (or other updates) to documents within the ODS 110. In some implementations, the document module 210 stores the documents, document versions, and other metadata related to the documents managed by the ODS 110 in document store 215. In some embodiments, the document module 210 interacts with the UI module 230, allowing users to create or import new documents, modify or view existing documents (including past versions of document and metadata about document), and otherwise interact with documents or document packages of the ODS 110. Documents (or certain types of document) can be associated with one or more actions that are automatically taken by the document module 210 when the document is imported, identified, or otherwise retrieved. In some implementations, the document module 210 maintains a version history recording changes made to documents. For example, a version history can include a record of previous changes to the clause (as well as previous versions of the clause), a time and/or date when each change was made, and an identifier of the user 130 made each change.

The document store 215 is a file storage system, database, set of databases, or other data storage system storing documents, document packages, version histories, and other information about documents managed by the ODS 110. The document store 215 can be implemented locally, remotely, using cloud computing services, or using any other suitable hardware or software techniques to store data.

The permission module 220 can manage and enforce user permissions for documents and document packages managed by the ODS 110, according to some embodiments. As described above, documents and document packages can be associated with permissions controlling which users 130 can view, import, modify, and/or otherwise interact with that type of document or document package. In some implementations, permissions managed by the permissions module 220 explicitly reference a specific user 130 (for example, by name or unique user identifier). For example, a document package can be explicitly associated with one (or more) users 130 to oversee ODS 110 as it splits the document package into one or more component documents.

Permissions may also be assigned to users 130 using a set of defined rules, for example, rules based on membership in an entity, group, or subgroup of users 130 and/or characteristics of the user 130. Users 130 may be assigned additional permissions based on an associated with a specific company or based on membership in a subgroup of users 130 (such as a legal team of a company). Similarly, a type of document or document package can be associated with one or more roles, each with defined permissions (such as "buyer" or "buyer's agent"). Individual users 130 can then be assigned to the roles for each instance of a document/document package of that type.

The permission module 220 may store permissions in a set of "permission definitions" storing permissions for a user 130 (or group of users). In some implementations, each permission definition stores a description of one or more permissions (for example, editing or viewing permissions), an indication of one or more entities 140, documents, or document packages the permission definition applies to, and identification of the set of users 130 the permission definition applies to. For example, a permission definition can grant permissions to a user 130 based on an individual identifier of the user 130, based on association with an entity 140, based on the user's membership in a subgroup or association with a role or title, or based on another characteristic of the user 130. Similarly, a permission definition can define the documents and/or document packages the permission definition applies to based on a direct identifier of an entity 140, document, or documents package or based on a logic rule defining documents and/or clauses the permission definition grants permissions to. For example, a permission definition can specify a combination of one or more document types (such as "sales contract"), and/or user characteristics defining situations to which the permission definition applies.

The permission module 220 may assign permissions to view, edit, approve edits to, sign, or otherwise modify a document. Similarly, the permission module 220 can assign various permissions related to the import and management of document packages, such as permissions for uploading document packages, and permissions for modifying how the ODS 110 recognizes documents for certain types of document packages. Other implementations of the permissions module 220 can include more or different permissions assignable to users 130.

The UI module 230 generates user interfaces allowing users 130 to interact with documents and document packages managed by the ODS 110, according to some embodiments. For example, the UI module 230 can receive user instructions from a web-based or mobile application users 130 interact with to provide instructions to the ODS 110. In some implementations, the UI module 230 provides a user interface enabling users 130 to add, delete, or modify the contents of a document based on one or more permission definitions. A user interface provided by the UI module 230 can allow users to modify content such as text, images, links to outside sources of information such as databases, and the like. Similarly, the UI module 230 can provide a user interface for authorized users 130 to view or modify permissions definitions granting permissions to other users 130. The UI module 230 may also provide user interfaces for setting up the ODS 110 to import a type of document package, importing document packages, managing imported document packages, and the like.

The package intake module 240 receives document packages from a document package source 140 (such as a user 130 or an automated system) and analyzes received document packages to identify one or more component documents within the document package, according to some embodiments. In some implementations, the package intake module 240 is able to use one or more identification methods (such as searching for specific text appearing within one or more pages) to identify component documents within a document package. A component document may be identified based on one or more document identification rules instructing the package intake module 240 on how to accurately identify that type of document (such as by outlining identifying features of that type of document that can be determined using the identification methods).

In some embodiments, individual component documents of a document package are recognized based on a package template including document identification rules for one or more component documents expected to be in that type of document package. A package template, as used herein, is a collection of rules used to identify instances of a type of one or more component documents within a received document package. For example, the document identification rules for recognizing a specific tax form can include rules that can identify instances of that tax form regardless of the specific contents of that instance of the form. Each document identification rule may identify a set of recognition methods and parameters the package template 410 can use to identify documents.

Each package template may be associated with a specific type of document package, such as a "real estate closing package" or a "taxes" document package, and one or more document package sources 140 from which matching document packages might be received. Depending on the identification methods relied on in a package template, the package template may apply to a wide range of potential document packages. For example, real estate closing packages generally contain documents from out of set of potential closing documents (as certain types documents might not be needed for every transaction) but the length, format, and order of documents within a specific instance of a real estate closing package may vary depending on the specifics and complexity of that real estate transaction (and which document package source 140 initially put together the real estate closing package). Therefore, the package template for a closing package can be flexible enough to apply to a variety of closing packages received from (potentially) multiple different document package sources 140.

The package intake module 240 can associate a received document package with a package template using one or more rules (such as rules based on the document package source 140 the package was received from, the filename of the document package file, or other metadata of the document package) and/or a user selection of an appropriate package template at the time the document package was imported. In some implementations, the package intake module 240 groups identified component documents into one or more stacks (groups of component documents) based on the package template. The package template may associate each document stack with one or more actions of the ODS 110. For example, on recognizing a document stack in a received document package, the ODS 110 can grant permissions over the document stack to one or more users 130, send the document stack for review and/or storage, tag and send the document stack to specific users 130 for signature, or the like based on instructions for the document stack stored in the package template.

Package templates may include pre-assigned default permissions associated with user roles that can be later be filled when a document package matching the package template is imported into the ODS 110. For example, a package template for a real estate closing package may include permission roles for the buyer's agent, buyer, seller's agent, seller, and lender, each associated with one or more document stacks. In some implementations, the user 130 importing a document package into the ODS 110 adds other users 130 (or themselves) to one or more permission roles for the document package. Similarly, permissions/roles can automatically be assigned to one or more users 130 based on default permissions associated with the document package source 140 or metadata associated with the document package.

Figure 3:
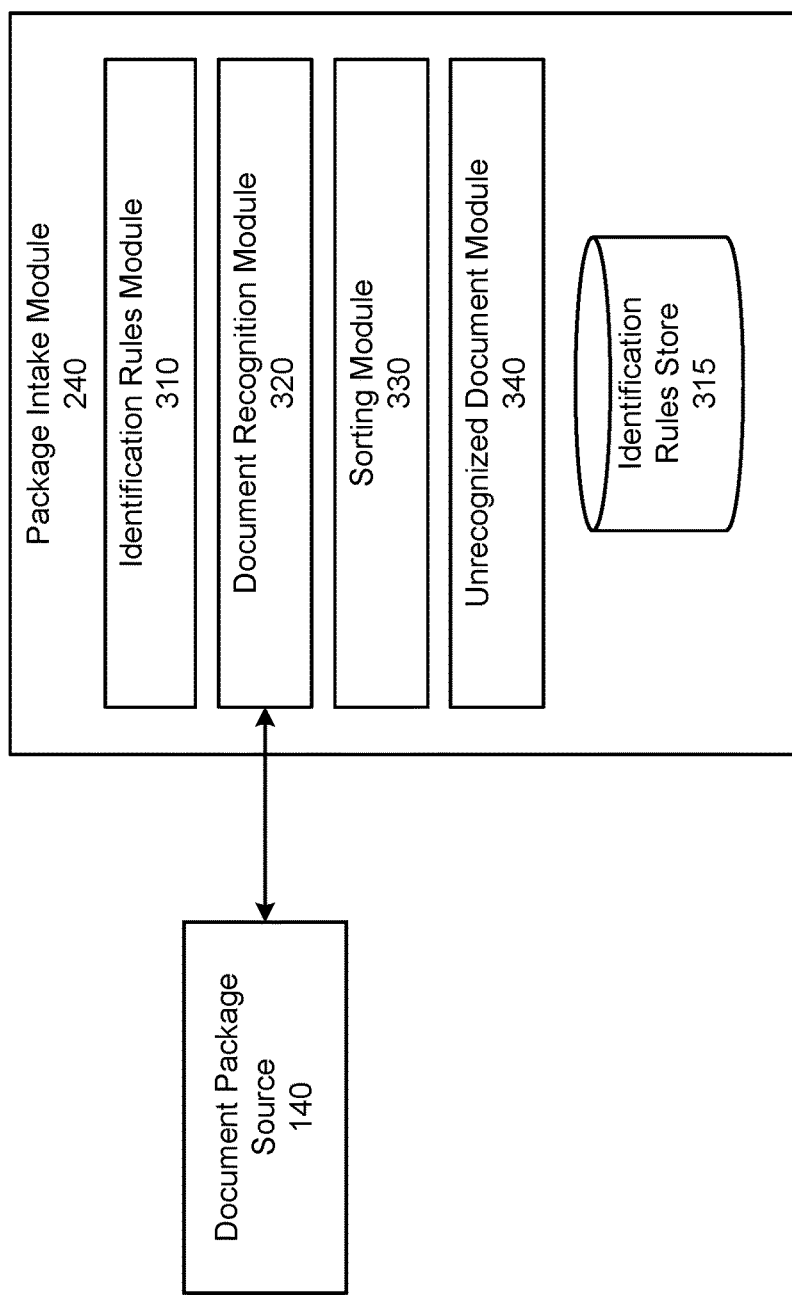
FIG. 3 is a block diagram of a package intake module, according to an example embodiment.

FIG. 3 is a block diagram of a package intake module, according to an example embodiment. The package intake module 240 of FIG. 3 includes an identification rules module 310, an identification rules store 315, a document recognition module 320 in communication with a document package source 140, a sorting module 330, and an unrecognized document module 340.

The identification rules module 310, according to some embodiments, allows users 130 to create (or update) package templates, add document identification rules to package templates, configure a document identification rule to identify a specific type of document, separate component documents into stacks, and otherwise modify package templates. In some embodiments, each package template is associated with permission for administrator users ("package administrators") for that package template. A package administrator may initially set up the package template using the identification rules module 310 and can later return to update or otherwise modify the package template. As described above, the package intake module 240 may separately assign permissions for individual document packages recognized using the package template (a package administrator for a package template does not necessarily have administrator permissions over each instance of a document package processed using the package template). Using the identification rules module 310, package administrators can prepare package templates informing the package intake module 240 how to reliably identify component documents for a type of document package.

Figure 4:
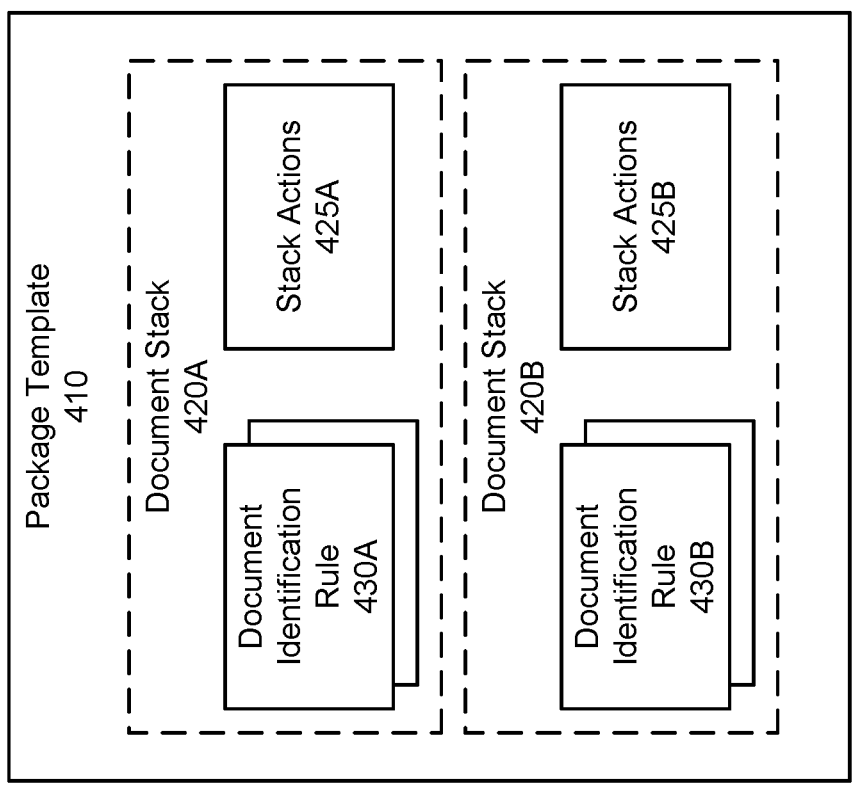
FIG. 4 is a block diagram of a package template, according to an example embodiment.

FIG. 4 is a block diagram of a package template, according to an example embodiment. The package template 410 of FIG. 4 includes several document stacks 420, each associated with a set of document identification rules 430 and a set of stack actions 425. Additionally, each package template can be associated with metadata, such as identifiers of package administrators, and a name and description of the package template (for example, to aid an importing user 130 in selecting the correct package template).

As described above, each document stack 420 (also referred to as a stack 420) represents a group of component documents (identified using document identification rules 430) on which the stack actions 425 associated with the document stack 420 are performed by the ODS 110 when the document package is being imported. Each component document may be associated with more than one document stack 420, for example, for document stacks 420 reporting distinct but overlapping sets of component documents to different entities. Similarly, some implementations can use a hierarchical model for document stacks 420, where a sub-stack can include additional stack actions 425 to be performed only on the sub-stack. Package template 410 may include a default document stack (and default stack actions 425).

A set of stack actions 125 may include instructions for reporting or sending a copy of the document stack to a certain user 130, user role, or other entity, for example, via email, physical mail, or notification within the ODS 110. Similarly, stack actions 125 can instruct the ODS 110 to automatically take a specific action on the document stack, such as changing the storage location or status of a component document within the ODS 110, adding the document stack to a collaborative "room" or space within the ODS 110 where it is viewable and/or editable by users 130 (such as a room devoted to a real estate closing event), associating documents of the document stack with a specific task in a workflow of the ODS 110, marking the document stack for deletion, locking the document stack from future editing, or the like. Additionally, a set of stack actions 425 may instruct the ODS 110 to require users 130 (identified either by a user identifier or indirectly through association with a specific role) to take actions related to the document stack and/or assign relevant permissions to those users 130 (such as editing/viewing/approval permissions). For example, a stack action 425 may request that a user 130 digitally sign (or wet sign) the documents of a document stack. In some implementations, a document stack 420 is associated with more than one stack action. For example, a set of stack actions 425 that requests a digital signature can include a first action assigning signing permissions to a specific user role, a second action for tagging a component document with the correct locations for the user to sign (based on a template for the component document), and a final action for sending a notification to the user to digitally sign the document stack. In some implementations, the package intake module 240 may select stack actions to be taken for a document stack 420 out of multiple options defined in the package template 410 based on, for example user 130 selection or metadata of the document package. For example, a user 130 could specify that an uploaded document package should be handled using "fully digital" or "hybrid digital/wet sign" stack actions defined in a package template 410. If the hybrid option is selected, the package intake module 240 can select physical signature workflow stack actions for one or more document stacks. Alternatively, if the user 130 selects the fully digital option, those same document stacks may instead be associated with a digital signature workflow.

As described above, each document identification rule 430 can include identification methods and parameters allowing the package intake module 240 to identify the pages of a component document out of the document package. In some implementations, a document identification rule 430 uses different identification methods to identify different parts of the component document. For example, the first page of a component document may be easy to identify, but subsequent pages may be identified by inference (for example, due to proximity to the identified first page). Document identification methods can include recognizing a document-specific identifier for the desired type of document on one or more pages. For example, document-specific identifier can be a text identifier (such as a form number, title of the document, or the like), a barcode (or a QR code), or another unique feature of that type of document (compared to other documents in the document package). Similarly, a document identification rule 430 can use relative identifiers (such as page numbers, or position within the document package) to identify a component document or link additional pages to a certain component document. For example, a page number on a page including a text identifier can be used to also associate other pages following that numbering scheme with the text identifier. Similarly, positional identifiers can also be used to identify some component documents, such as for document packages where the component documents are always presented in a certain order (or if a certain component document always occurs first) and/or where a component document is always a fixed length.

In some implementations, each document identification rule 430 includes one or more identification methods (such as document identifier on every page, fixed length document, or document identifier combined with page number) and appropriate parameters for those identification methods. Parameters for an identification method can include, for example, an identifier type and master identifier (such as a standardized title or barcode number that the package intake module 240 will match with the document content), the number of pages in a fixed length document, and/or a position of a component document relative to other component documents. One document identification rule 430 may include multiple identification methods with logical relationships to each other. For example, two identification methods can be arranged as alternates (a logical OR relationship) such as for a document that may have two alternate titles recognized by text identifiers. Similarly, identification methods within a document identification rule 430 can have logical AND relationships or any combination of relationships. In some embodiments, a document identification rule 430 is associated with one or more conditions for being satisfied for a given document, such as all (or a threshold number or percent) of the associated identification methods matching the given document. A document identification rule 430 may additionally include further details about the component document. For example, the document identification rule can additionally specify a priority order or hierarchy for ordering component documents within a stack 420 (allowing the order of component documents within a stack 420 to be specified independent of ordering within a received document package), a pre-made digital signature template marking various points for signature, and/or a task identifier for one or more tasks associated with that type of component document.

Figure 5:
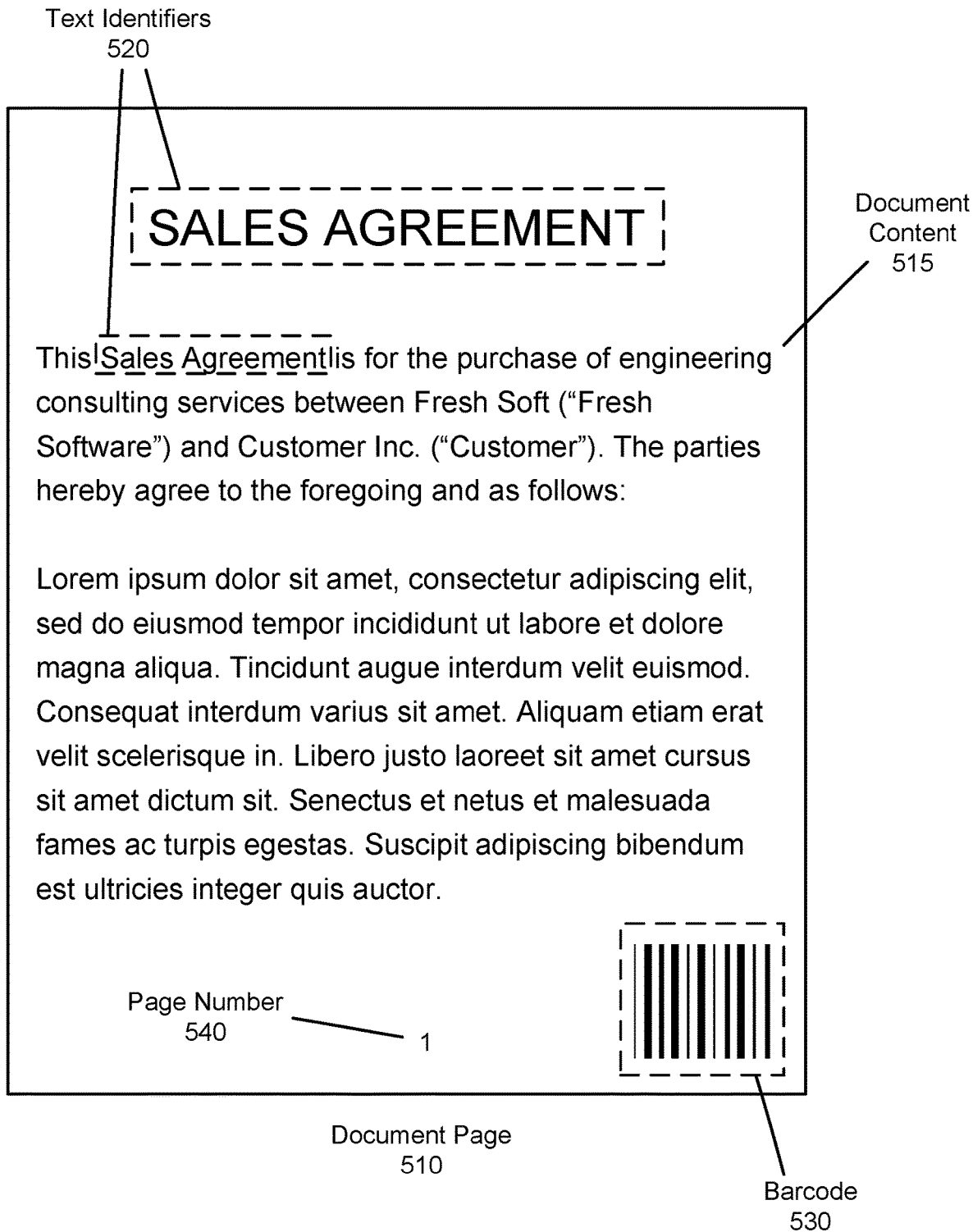
FIG. 5 illustrates an example page of a document included in a document package, according to an example embodiment.

FIG. 5 illustrates an example page of a document included in a document package, according to an example embodiment. The document page 510 of FIG. 5 includes document content 515 as well as several potential identification methods within the document content, such as text identifiers 520, a barcode 530, and a page number 540.

The document content 515 of a document page 510 can include text content, image content, or the like. In some implementations, text content can be presented in image form (such as for document pages 510 originating from a scanned document) with or without corresponding editable text elements. The ODS 110 may use OCR (Optical Character Recognition) techniques to generate editable text from an image of text for one or more document pages 510.

Text identifiers 520, as described above, are text strings or patterns that can be used to identify a component document. A definition of text identifier 520 can include the text string or pattern and optionally one or more additional parameters, such as a restriction on the portion of the document page 510 the text identifier 520 can appear in. For example, some text identifiers 520 may be restricted to the title, header, and/or footer of a document page 510, such as in situations where the text identifier 520 may occur in the body text of other documents but only the documents of the desired type are titled with the text identifier 520. The page number 540 of the document page 510 can be recognized in a similar way to a text identifier 520.

Barcodes 530 are another type of identifier that can be identified, in some implementations, from the image content of a document page 510. While FIG. 5 shows a linear (one-dimensional) barcode 530, the ODS 110 may also be capable of recognizing matrix or two-dimensional barcodes, such as QR (Quick Response) codes. Similarly, the ODS 110 may additionally use logos, symbols, or other small images as document identifiers. Similar to text identifiers 520, the definition of a barcode identifier 530 in a document identification rule 430 can and example barcode 530 and optionally one or more additional parameters, such as a restriction on the portion of the document page 510 the barcode 530 can appear in.

Returning to the identification rules module of FIG. 3, a package administrator may interact with the identification rules module 310 to add or modify a package template 410, document stacks 420, stack actions 425, or document identification rules 430. In some implementations, when adding a document identification rule 430, the package administrator can upload an example document or document package for the package template that is being created. Once an example document/document package is received, the identification rules module 310 can apply any existing document identification rules 430 to the uploaded document and notify the package administrator of any already-recognized component documents (for example, component documents the package administrator has already finalized the document identification rules for).

Using the example document/package, the identification rules module 310 may suggest one or more identification methods for the document identification rule 430 that can be approved or refined by the package administrator. For example, the identification rules module 310 may automatically recognize keys for identification methods supported by the package intake module 240, such as barcodes in a document package, a text identifier appearing a subset of pages, page numbers, or the like, and suggest these potential identification methods to the package administrator to generate a document identification rule. The package administrator can then manually select, add to, and/or modify the suggested set of identification methods to generate a final document identification rule 430, assign the component document to a document stack 420 and provide any other needed metadata for the component document (such as a digital signature template if that component document will need to be signed by a user 130). This process can then be repeated for other suggested identification methods, document identification rules 430, and example document packages until the package administrator is satisfied that the package template 410 is complete.

The identification rules store 315 can store generated package templates 410, according to some embodiments. The identification rules store 315 can be a database, database cluster, file-based storage system, cloud database, or other storage method.

The document recognition module 320, according to some embodiments, receives document packages from a document package source 140 and uses document identification rules 430 to recognize one or more component documents contained in the document package. In some implementations, the document recognition module 320 first determines an appropriate package template 410 to apply to the document package (for example automatically, based on a selection by an importing user, based on metadata of the document package, or the like). Then the document recognition module 320 applies each document identification rule 430 associated with the package template 410 to the document package to identify one or more component documents within the document package. In some implementations, each component document is identified as a range of pages within the received document package.

In some implementations, the sorting module 330 can assign each recognized component document to the appropriate document stack(s) 420 based on the package template 410 and split the component document out of the document package. The sorting module 330 can then determine if there are any unrecognized pages not associated with a component document and/or document stack in the document package. The unrecognized pages of a document package can be assigned to a temporary unrecognized page stack for resolution by the unrecognized document module 340. The sorting module 330 may wait for the unrecognized document module 340 to resolve all unrecognized pages (by assigning them to documents and/or stacks) before the package intake module 240 continues processing the document package. In some implementations, a package template 410 may include a default stack action for the unrecognized document stack, such as a stack action grouping any unrecognized pages into an "unrecognized document" and notifying one or more users 130 of the unrecognized document for manual correction.

In some embodiments, the package intake module 240 relies on user 130 input (for example, via the unrecognized document module 340) to resolve unrecognized pages within document packages before proceeding with performing stack actions 425 or otherwise making component documents of the document package available to the rest of the ODS 110. Similarly, some types of document package require a manual approval or review of the automatic sort performed by the document recognition and sorting modules 320 and 330 before the package intake module 240 can perform stack actions. For example, a package template 410, importing user 130, or document source 140 can be flagged as requiring manual approval (for an importing user 130 or other user with appropriate permissions) in cases where a document package contains high risk, sensitive, or regulated component documents.

Once the recognition process for a document package is complete (for example, if the document package has no unrecognized pages and/or has received appropriate manual approvals), the package intake module 240 may perform each set of stack actions 425 on the component documents associated with the stack 420 (including any previously unrecognized pages or documents manually reassigned to different stacks). As described above, in some embodiments, the package intake module 240 can perform stack actions on assigned to the unrecognized document stack. Performing a stack action 425 may involve other components of the ODS 110 to contact users 130, create or modify documents within the ODS 110, prepare a document for digital signature, or the like.

The unrecognized document module 340 may display to an importing user 130 (or other authorized user 130) an interface identifying unrecognized pages in the document package. Through the unrecognized document module 340, a user 130 can, in some embodiments, manually review unrecognized pages, associate unrecognized pages with existing documents, and/or generate new documents including unrecognized pages. Similarly, the user 130 can associate documents generated from unrecognized pages with stacks 420 or create new stacks 140 and associated stack actions 425 for newly generated documents. In some implementations, the unrecognized document module 340 also provides an importing user 130 (or other appropriate user(s) 130) an interface for reviewing the automatically recognized documents/document pages and overriding the default stack actions 425 or stack assignments for that document package. For example, a package template 410 can be generated by a package administrator to apply to a type of document package to be regularly processed by the ODS 110. However, some instances of that type of document package may include additional or non-standard documents or stack actions (for example, based on a special request by a client) not covered in the package template 410. To handle these situations or to correct any errors in the package template 410, the unrecognized document module 340 allows users 130 to make changes to the handling of a specific document package without altering the package template 410 itself.

In some implementations, the set of unrecognized pages, the corresponding manual changes/assignments made using the unrecognized document module 340, the uploaded document package, and/or the applied package template 410 are logged for later use in improving the package template 410 (for example, to recognize previously unrecognizable pages or to account for an overlooked document or page appearing in many document packages). For example, improvements to a package template may be made manually, through an update of the package template 410 by a package administrator. The package administrator can review all instances of unrecognized pages (and corresponding manual fixes) for a package template 410 and adjust the package template 410 accordingly. For example, a certain type of document may be associated with a document identification rule 430 that does not cover all forms of that document type (such as a document type including optional appendixes or alternate formatting that weren't considered when the associated document identification rule was created). The package administrator for the package template 410 can then add new identification rules 430 to properly identify alternate forms of the document type and reduce the number of unrecognized pages when future document packages are uploaded.

However, improvements to the accuracy of the package template may be made without direct user input. In some implementations, the unrecognized document module 340 can use probabilistic methods (such as trained machine learning models) to supplement the generally deterministic document identification rules 430. For example, the unrecognized document module 340 may train a machine learning model to automatically assign (or make suggestions to assign) unrecognized pages based on logged sets of unrecognized pages and corresponding manual changes/assignments made for previous uploaded document packages associated with the same package template 410. Probabilistic recognition methods can be used to supplement the initial results achieved using the document identification rules 430. Similarly, in some embodiments, the package intake module 240 uses machine learning techniques to automatically make or suggest to a package administrator updates to a package template based on unrecognized document and/or manual update logs. For example, a package administrator can access the identification rules module 310 to update an existing package template 410 using a similar interface used to generate new package templates. The identification rules module 310 can then present examples of logged document packages (or just the unrecognized pages) for that package template along with suggested identification methods for the logged unrecognized pages (similar to the use of example document packages in the creation of package templates, as discussed above).

Example Document Recognition Processes

Figure 6A:
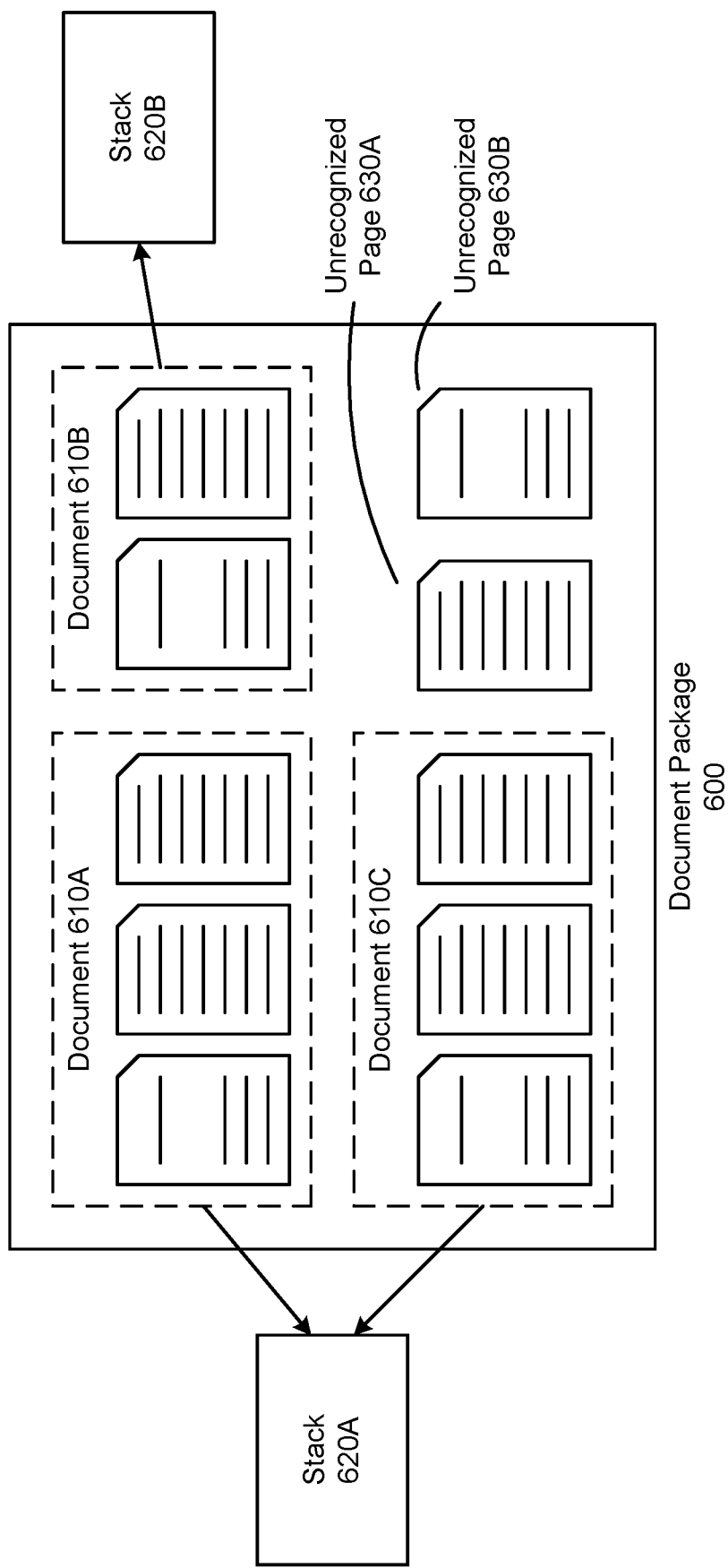
FIG. 6A illustrates an example document package with unrecognized pages, according to an example embodiment.

FIG. 6A illustrates an example document package with unrecognized pages, according to an example embodiment. The document package 600 of FIG. 6A includes documents 610, stacks 620, and a set of unrecognized pages 630. Each document 610 in the document package 600 includes a set of pages the package intake module 240 associated with each other and with a document type (for example, based on a document identification rule 430 of a package template 410, as described above). Similarly, each document is associated with a stack 620 (also defined by the package template 410). However, in this instance, the automatic processes of the package intake module 240 failed to recognize/associate with a document the set of unrecognized pages 630. At this point, the unrecognized page module 340 can solicit input from the importing user 130 to resolve the unrecognized pages 630.

Figure 6B:
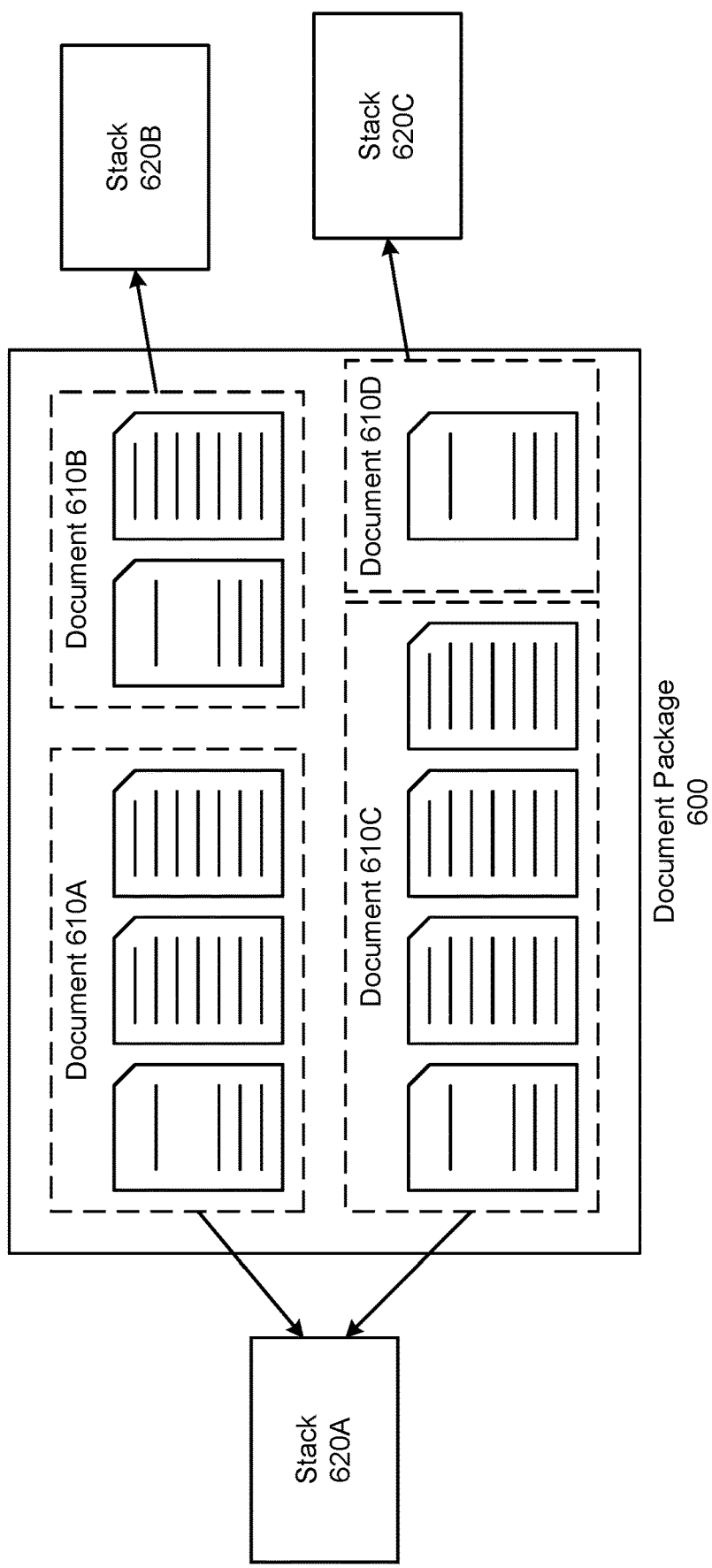
FIG. 6B illustrates an example document package with unrecognized pages resolved, according to an example embodiment.

FIG. 6B illustrates an example document package with unrecognized pages resolved, according to an example embodiment. FIG. 6B depicts the document package 600 of FIG. 6A after the importing user 130 assigned the set of unrecognized pages 630 to documents. In this case, the unrecognized page 630A has been assigned to the end of existing document 610C and unrecognized page 630B was associated with a new document 610D and stack 620C. Now that all unrecognized pages have been accounted for, the package intake module 240 can proceed to performing stack actions 425 and otherwise processing the documents 610.

Figure 7:
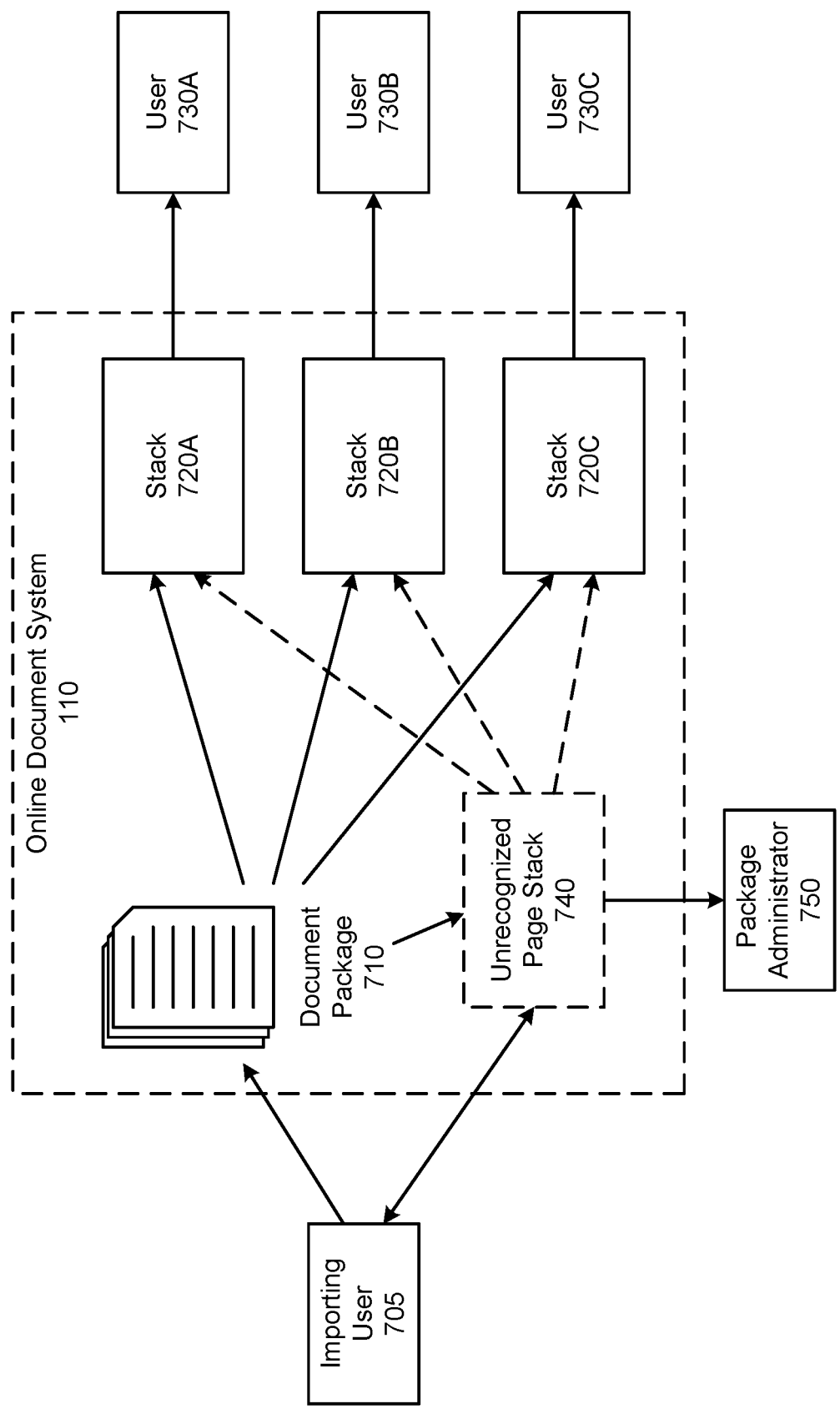
FIG. 7 illustrates splitting an example document package into document stacks, according to an example embodiment.

FIG. 7 illustrates splitting an example document package into document stacks, according to an example embodiment. In the embodiment of FIG. 7, the online document system 110 receives a document package 710 associated with an importing user 705. The ODS 110 then recognizes one or more component documents within the document package 710 (for example, using a package template the importing user 705 assigns to the document package 710) where each component document is associated with pages of the document package 710 identified by the ODS 110 as being part of that component document (for example, using document identification rules of the associated package template). The ODS 110 may then split the document package 710 into stacks 720, with each stack 720 being assigned a subset of the component documents of the document package 710 (as described above, one component document can be assigned to multiple stacks 720 depending on the embodiment).

In some instances, the ODS 110 may fail to fully recognize every page of the document package, for example, there may be additional or unexpected documents included in the document package 710 (or new formatting on an expected document) that are not accounted for in the package template the ODS 110 uses to recognize individual documents. These unrecognized pages that were not initially assigned to a component document can be placed in the temporary unrecognized page stack 740. The importing user 705 (or other authorized user 130) can then manually assign unrecognized pages in the unrecognized page stack 740 to existing or new component documents and/or stacks 720. As described above, the unrecognized page stack 740 and any changes made by the importing user 705 are logged and sent to a package administrator 750 of the package template 410 used for the document package 710. The package administrator 750 or ODS 110 can then use this data (aggregated with data from other document packages) to update the package template 410.

After each page of the document package 710 is assigned to a component document and stack 720 (either automatically by the package intake module 240 or through the unrecognized page stack 740) the ODS 110 can perform one or more stack actions on each of the stacks 720, such as transmitting the stacks 720 to users 730, making component documents of the stack 720 accessible to a user 730 in the ODS 110, or the like.

Figure 8:
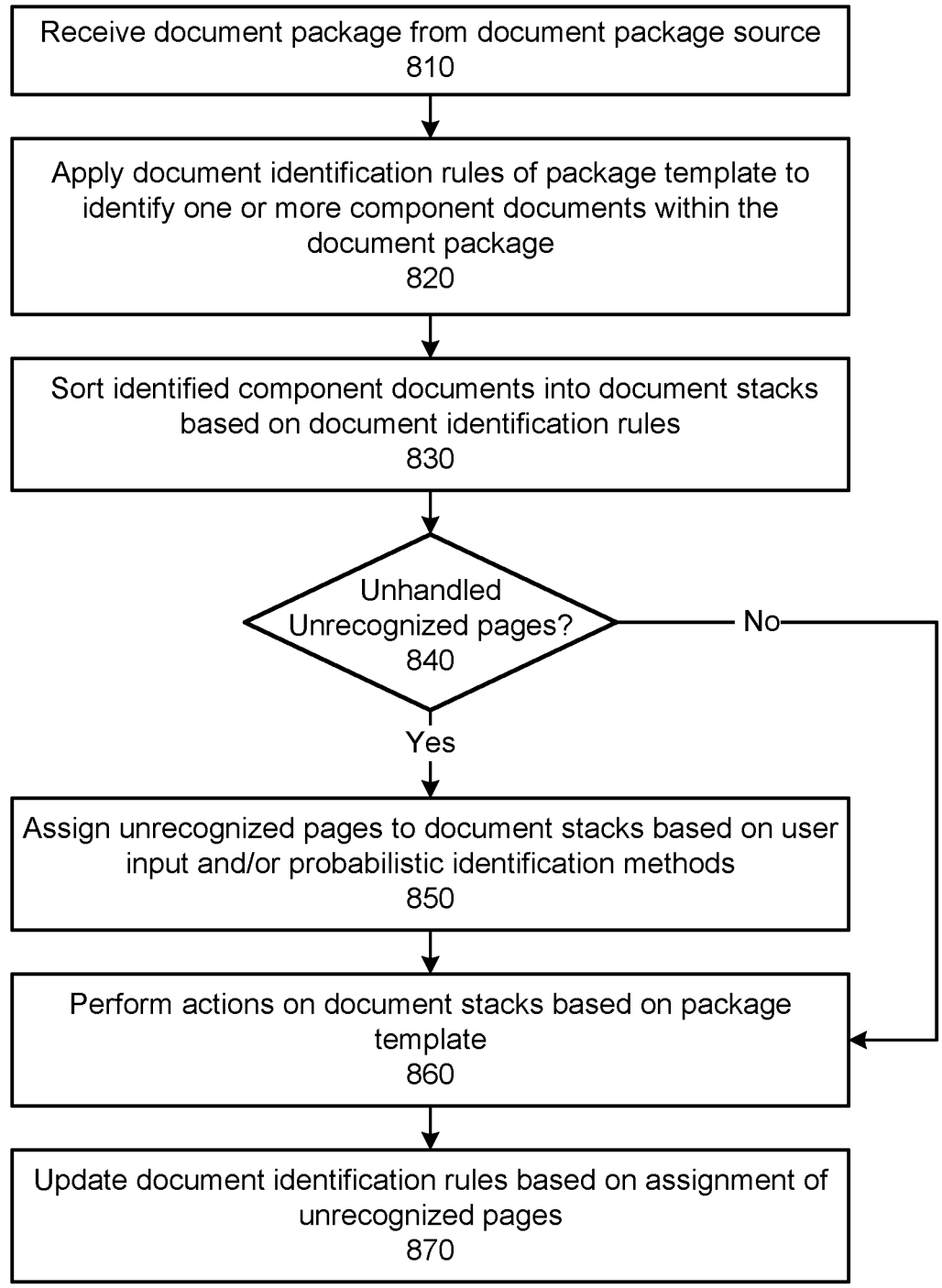
FIG. 8 is a flowchart illustrating an example process for splitting a document package into document stacks, according to an example embodiment.

FIG. 8 is a flowchart illustrating an example process for splitting a document package into document stacks, according to an example embodiment. The process 800 of FIG. 8 begins when the online document system receives 810 a document package from a document package source. Then, the online document system applies 820 one or more sets of document identification rules to the document package to identify one or more documents within the document package. As described above, the document identification rules can be contained within a package template associated with a category of document package, document package source, or the like. Once identified, the online document system sorts 830 the identified component documents into document stacks based on the document identification rule for each component document.

After the initial automatic sort process (based on the document identification rules) is complete, the online document system checks 840 for the presence of unrecognized pages within the document package. If there are one or more unrecognized pages, the online document system assigns 850 the unrecognized pages to documents and document stacks based on user input (a manual assignment) and/or a supplementary probabilistic identification method (for example, a machine learning model trained using previous manual assignments of unrecognized pages associated with a package template). As described above, unrecognized pages may also handle unrecognized pages by assigning default stack actions to the set of unrecognized pages in a document package. Any unrecognized pages within the document package have been identified and handled, the online document system proceeds to perform 860 one or more actions on the component documents of each document stack (as laid out in the package template). Optionally, a package administrator of the package template can update 870 the document identification rules of the package template based on the assignments of any identified unrecognized pages.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing, by a document system, a document package comprising a plurality of digital documents combined into a document file;
determining, by the document system, a package template based on the document package;
determining, by the document system, a first plurality of pages of the document file corresponding to a first digital document of the plurality of digital documents;
determining, by the document system, one or more second pages of the document file corresponding to a second digital document of the plurality of digital documents;
determining, by the document system and based on one or more rules of the package template, that the first digital document and the second digital document are assigned to a document group;
and
in response to determining that the first digital document and the second digital document are assigned to the document group:
assigning, by the document system and based on a set of defined rules specified by the package template, one or more permissions to a user; and
sending, by the document system and based on assigning the one or more permissions to the user, the first digital document and the second digital document, wherein sending comprises refraining from sending a third digital document of the plurality of digital documents.

2. The method of claim 1, further comprising:
combining, by the document system, one or more document groups in a predetermined order to produce a completed document package.

3. The method of claim 1, wherein a page of the first plurality of pages comprises page content for display determining the first plurality of pages corresponding to the first digital document is based on a text identifier within the page content of the page.

4. The method of claim 1, wherein a page of the first plurality of pages comprises page content for display and wherein determining the first plurality of pages corresponding to the first digital document is based on a barcode within the page content of the page.

5. The method of claim 1, wherein a page of the first plurality of pages comprises page content for display and wherein determining the first plurality of pages corresponding to the first digital document is based on a proximity of the page to one or more pages already associated with the first digital document.

6. The method of claim 1, wherein a page of the first plurality of pages comprises page content for display and wherein determining the first plurality of pages corresponding to the first digital document is based further on a page number within the page content of the page.

7. The method of claim 1, further comprising:
assigning, by the document system and based on user input, one or more unrecognized pages of the document package to a digital document of the plurality of digital documents.

8. The method of claim 7, further comprising:
updating, based on the user input and by the document system, a set of document identification rules for determining the first plurality of pages of the document file corresponding to the first digital document.

9. The method of claim 7, further comprising:
updating, based on the user input and by the document system, a machine learning model for determining the first plurality of pages of the document file corresponding to the first digital document.

10. The method of claim 1, wherein the one or more rules of the package template comprises one or more of a first rule indicating a document package source, a second rule indicating a filename of the document file, or a third rule indicating a user selection of the package template at a time the document package was imported to the document system.

11. Non-transitory computer-readable storage media comprising instructions that, when executed, cause a computing system to:
access a document package comprising a plurality of digital documents combined into a document file;
determine a package template based on the document package;
determine a first plurality of pages of the document file corresponding to a first digital document of the plurality of digital documents; and
determine one or more second pages of the document file corresponding to a second digital document of the plurality of digital documents;
determine, based on one or more rules of the package template, that the first digital document and the second digital document are assigned to a document group; and
in response to determining that the first digital document and the second digital document are assigned to the document group:
assign, based on a set of defined rules specified by the package template, one or more permissions to a user; and
send, based on assigning the one or more permissions to the user, the first digital document and the second digital document, wherein to send, the instructions cause the computing system to refrain from sending a third digital document of the plurality of digital documents.

12. The non-transitory computer-readable storage media of claim 11, wherein the instructions further cause the computing system to combine one or more document groups in a predetermined order to produce a completed document package.

13. The non-transitory computer-readable storage media of claim 11, wherein a page of the first plurality of pages comprises page content for display and wherein the instructions cause the computing system to determine the first plurality of pages corresponding to the first digital document based on a text identifier within the page content of the page.

14. The non-transitory computer-readable storage media of claim 11, wherein a page of the first plurality of pages comprises page content for display and wherein the instructions cause the computing system to determine the first plurality of pages corresponding to the first digital document based on a barcode within the page content of the page.

15. The non-transitory computer-readable storage media of claim 11, wherein a page of the first plurality of pages comprises page content for display and wherein the instructions cause the computing system to determine the first plurality of pages corresponding to the first digital document based on a proximity of the page to one or more pages already associated with the first digital document.

16. The non-transitory computer-readable storage media of claim 11, wherein a page of the first plurality of pages comprises page content for display and wherein the instructions cause the computing system to determine the first plurality of pages corresponding to the first digital document based further on a page number within the page content of the page.

17. The non-transitory computer-readable storage media of claim 11, wherein the instructions further cause the computing system to assign, based on user input, one or more unrecognized pages of the document package to a digital document of the plurality of digital documents.

18. The non-transitory computer-readable storage media of claim 17, wherein the instructions further cause the computing system to update a set of document identification rules for determining the first plurality of pages of the document file corresponding to the first digital document.

19. The non-transitory computer-readable storage media of claim 17, wherein the instructions further cause the computing system to update, based on the user input, a machine learning model for determining the first plurality of pages of the document file corresponding to the first digital document.

20. A system comprising:
one or more processors; and
non-transitory computer-readable storage media comprising instructions that, when executed, cause the one or more processors to:
access a document package comprising a plurality of digital documents combined into a document file;
determine a package template based on the document package;
determine a first plurality of pages of the document file corresponding to a first digital document of the plurality of digital documents;
determine one or more second pages of the document file corresponding to a second digital document of the plurality of digital documents;
determine, based on one or more rules of the package template, that the first digital document and the second digital document are assigned to a document group; and
in response to determining that the first digital document and the second digital document are assigned to the document group:
assign, based on a set of defined rules specified by the package template, one or more permissions to a user; and
send, based on assigning the one or more permissions to the user, the first digital document and the second digital document, wherein to send, the instructions cause the one or more processors to refrain from sending a third digital document of the plurality of digital documents.

* * * * *